United States Patent [19]

Rausing

[11] 4,189,456
[45] Feb. 19, 1980

[54] METHOD FOR FORMING CONTAINERS WITH FOAMED CORNERS

[76] Inventor: Anders R. Rausing, Via Kenia 22-24, Rome, Italy

[21] Appl. No.: 737,514

[22] Filed: Nov. 1, 1976

[30] Foreign Application Priority Data

Nov. 4, 1975 [CH] Switzerland .............. 14225/75

[51] Int. Cl.$^2$ .............. B29D 27/00; B29D 7/02; B29D 7/20; B29D 25/00
[52] U.S. Cl. .............. 264/25; 264/45.9; 264/51; 264/53; 264/234; 264/345; 264/339
[58] Field of Search .............. 264/22, 25, 45.9, 51, 264/52, 345, 321, 234, 339; 220/9 F, 74, DIG. 14; 229/3.5 R

[56] References Cited

U.S. PATENT DOCUMENTS

| | | | |
|---|---|---|---|
| 2,825,282 | 3/1958 | Gergen et al. | 264/52 |
| 3,031,121 | 4/1962 | Chase | 220/9 F |
| 3,170,974 | 2/1965 | Jacobs | 264/321 |
| 3,189,243 | 6/1965 | Lux | 220/9 F |
| 3,381,076 | 4/1968 | Gouatsos | 220/9 F |
| 3,407,111 | 10/1968 | Reilly | 156/79 |
| 3,808,301 | 4/1974 | Pruden | 264/345 |
| 3,832,429 | 8/1974 | Charpentier | 264/345 |
| 3,936,518 | 2/1976 | Soda et al. | 264/DIG. 14 |
| 3,980,216 | 9/1976 | Nye | 220/9 F |

FOREIGN PATENT DOCUMENTS

622808  3/1963  Belgium .............. 264/51

Primary Examiner—W. E. Hoag
Attorney, Agent, or Firm—Burns, Doane, Swecker & Mathis

[57] ABSTRACT

The walls which form a packing container are made from an extruded polystyrene foam plastic material which is stiffened along variously positioned rectilinear zones in the surface by effecting an increase in thickness of the plastic along those zones. The foamed plastic material is initially of uniform thickness during formation of the container but those zones of the walls which are to be thickened have a higher cell density factor than the remaining portions of the walls and hence a higher latent expansion capacity which, after the container has been formed, is released by heating to such an extent that the cell walls soften and are expanded by the increased gas pressure within them. The foamed plastic packing material is formed by extrusion through a die and is of uniform thickness. The desired zones of higher density are established in the material by subjecting those zones to a cooling operation.

8 Claims, 9 Drawing Figures

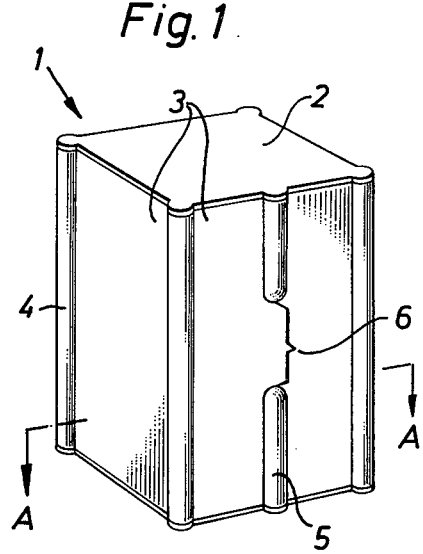
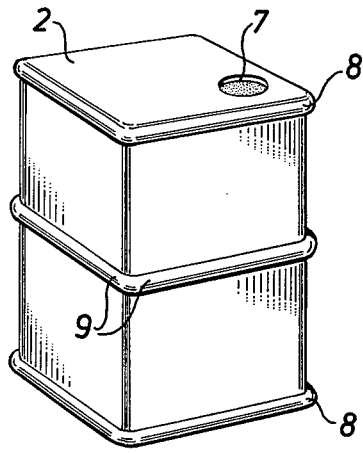
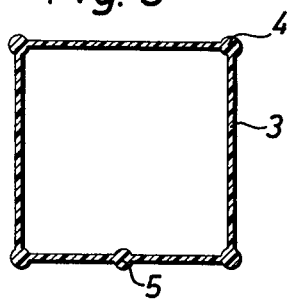
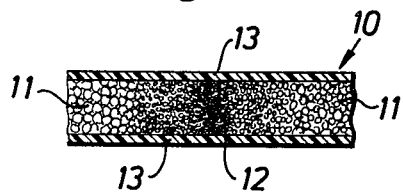
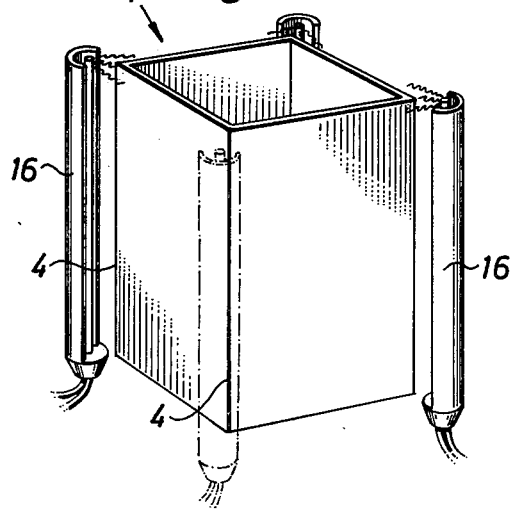
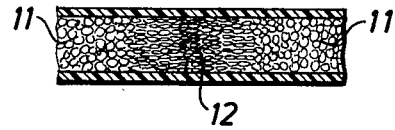
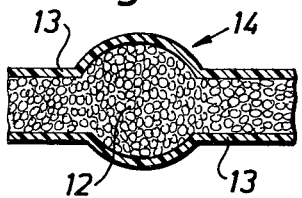

METHOD FOR FORMING CONTAINERS WITH FOAMED CORNERS

The present invention relates to a method for the manufacture, from a packing material comprising at least one layer of an extruded foamed plastic material, of packing containers having stiffening portions, the said layer of foamed plastic material having preferably linear parts of a higher density of the foamed plastics.

The invention also relates to packing containers manufactured in accordance with the method, and to packing material for the manufacture of packing containers, and to the method for the manufacture of the said packing material.

In packaging technique consumer packages, e.g., for milk, are frequently manufactured in that a web of a packing material, which is so thin and flexible that it can be rolled up in a magazine roll, is converted to a tube, the longitudinal edges of the web being joined to one another in a sealing joint, whereupon the said tube is filled with the intended contents and is formed to packing containers of e.g., parallelepipedic shape. It is also a general occurrence to manufacture consumer packages from previously prepared, plane blanks which themselves may preferably be taken from a packing material web which for the purpose of transport and storage is rolled up in a magazine roll.

A number of advantages are derived from having packing material in roll form for transport, storage and handling. One advantage is that the packing material takes up relatively little space if it is rolled up in a magazine roll, and another advantage is that the measures which have to be taken for the wrapping in connection with transport are not so comprehensive as when the material is constituted of prefabricated blanks which have to be transported in specially arranged cartons or boxes. It is a further advantage that it is hygienic if the packing material is in a tightly rolled magazine roll, as the side surfaces of the packing material are effectively protected against contamination or other external effects.

A pre-condition for allowing packing material to be rolled in a magazine roll is that it must be sufficiently thin and flexible, so that it can be rolled up without any creases appearing in the material. It is another pre-condition that the material must be of uniform thickness, so that it can be rolled up in a magazine roll without the roll becoming askew.

In cases when the packing material is constituted, at least partially, of foamed plastic material, e.g., polystyrene foam, the material must not be made too thick, since creases will then appear during the rolling. It is desirable, on the other hand, to provide the finished package with relatively stiff package walls so that it can be gripped by hand without being deformed to an appreciable degree. A stiffening of the package can be obtained with the help of joist-like stiffening constructions which may consist in that the packing material is of varying thickness and has a greater material thickness along joist-like reinforcements. As mentioned before, however, such a packing material cannot advantageously be rolled up in magazine rolls, and the present invention provides a solution to the problem of making packing containers from a packing material which is so flexible that it allows the rolling up in magazine rolls, and at the same time has such properties that the finished packing containers can be provided with stiffening joint constructions.

The present invention is characterized in that the packing material is formed to packing containers of the desired shape, whereupon the said packing containers, at least along the said parts with higher density, are heated to such an extent that the foamed plastic material along the said parts is made to expand, so as to form joist-like stiffenings of greater thickness than the surrounding parts of the package wall.

The invention also relates to a packing material which is characterized in that it comprises a layer of a foamed plastic material, preferably polystyrene foam plastics, which packing material has a substantially constant thickness, that the foamed plastics layer has regions along which the foamed plastic material has higher density than in the surrounding regions, and that the individual cells in the said regions of higher density are smaller than the cells in the surrounding areas, together with a method for the manufacture of this packing material, which method is characterized in that a tube or a web of foamed plastic material is extruded through an extruder die, whereby the foamed plastic material, before or in connection with the pressing out of the foamed plastics from the extruder die, is cooled along certain zones of the die, whereby the cellular structure along the regions of the uniformly thick web or tube, which during the extrusion have passed through the said zones, obtains a cellular structure which substantially differs from the remaining regions, which cellular structure is characterized by small but numerous cells and higher density than in the surrounding regions.

In the following, the invention will be described with reference to the enclosed schematic drawings, wherein:

FIG. 1 shows a perspective view of a package in accordance with the invention,

FIG. 2 shows a variant of a package in accordance with the invention,

FIG. 3 shows a section A—A of the packing container shown in FIG. 1,

Figure 7:
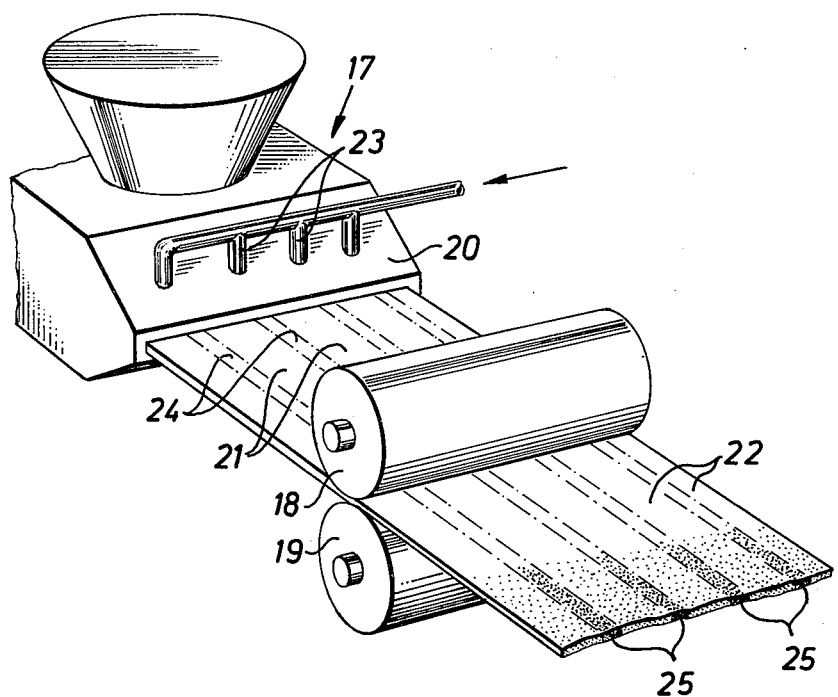
Figure 8:
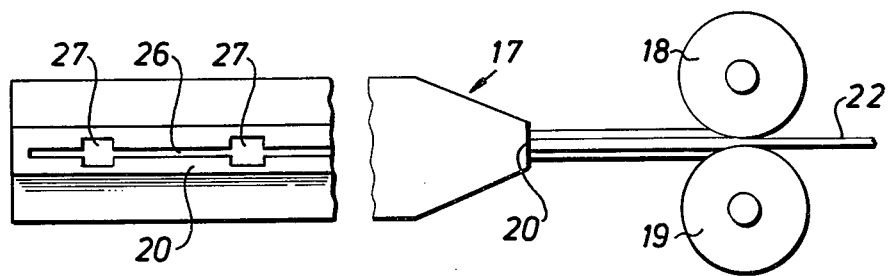

FIG. 4 shows a strongly enlarged section through a packing material in accordance with the invention, FIG. 5 shows a strongly enlarged section through an expanded part of the packing material, FIG. 6 shows a schematic arrangement for the manufacture of packages in accordance with the invention, FIG. 7 shows an arrangement for the manufacture of packing material in accordance with the invention, and FIG. 8 shows a further design of an arrangement for the manufacture of the packing material in accordance with the invention.

As is evident from what has been said previously, the invention is based on the concept of the manufacture of packing containers from a packing material which is prepared so as to have regions with latent expansion capacity, where it is possible to release the expansion by heating. The packing material, which is of uniform thickness during the formation of the package, can thus be treated locally, after the formation of the package in such a manner that the final packing container has stiffening joists along the predetermined regions, which joists are constituted of thickenings in the packing material. Such joists naturally contribute to a high degree to the stiffening of the package and make it possible for the portions of the package wall located in between to be made thinner, so that packing material can be economized.

In the following, some embodiments of packages in accordance with the invention will be discussed, together with a method for the manufacture of these packages, and moreover the packing material itself and the method for its manufacture will be described. In principle all suitable foamed plastic materials can be used for packages in accordance with the invention, but for the present polystyrene plastics appear to be the most suitable from the points of view of cost, environment and availability. For the sake of clarity it is assumed in the following example that the foamed plastic material consists of extruded polystyrene foam plastics, the flexibility of which can be controlled within relatively wide limits by additions of e.g., butadiene.

The packing container 1 shown in FIG. 1 has plane side surfaces 3 and a top or a lid 2 and also a base, not shown in the drawing. The package has thus a certan conventional parallelepipedic shape, and since the design of the packing container does not influence the concept of the invention, it is assumed that lid and base portions have been fitted in an optional, suitable manner. The packing container 1 also has longitudinal, parallel joists 4 extending along the lateral edges where adjacent walls come together and, which constitute an integral part of the remaining walls of the package, though forming thickened portions of the same. For a further stiffening of the construction the side walls 3 can be provided with stiffening joists 5, also along the portions of the package body which do not form lateral edges 4 of the package, and as indicated in the figure it is possible to provide a break 6 in the said stiffening joists 5. A packing container in accordance with FIG. 1 obtains appreciably increased stiffness in its longitudinal direction, which is a great advantage in packing containers which are intended to be stacked on top of one another, and the stiffness across the lateral surfaces is also increased, which means that the packing containers can better withstand the stresses which arise when a package is gripped by hand.

In FIG. 3 is shown a cross-section through a package in accordance with FIG. 1, and as can be seen, the side walls 3 are relatively thin, whilst by contrast the corner portions or lateral edges 4 have appreciable thickenings, so as to form the joist-like longitudinal structures. The expansion of the packing material mostly takes place outwards, but depending on the method of manufacture, expansion inwards is also possible and the joists are then largely inside the packing container. In this case, however, the portions intended for expansion must be heated from the inside of the packing container, and this part of the operation must then be carried out before at least one of the end faces of the package has been applied.

In FIG. 2 is shown a packing container 1 of the same geometrical configuration as the packing container shown in FIG. 1. However, the packing container shown in FIG. 2 is provided with stiffening joists 8,9 which are located parallel with the end surfaces 2 of the packing container, one of which in the embodiment shown is provided with a pouring opening 7. The stiffening or reinforcement joists 8,9 which are arranged in the manner as shown in FIG. 2, impart to the packing container 1 a considerably better lateral stiffness than that achieved in the packing container which is shown in FIG. 1. On the other hand, the stacking rigidity is not increased here to a substantial degree, and when choosing the orientation of the reinforcement joists it should therefore be considered, whether a stiffening of the packing container in longitudinal or in transverse direction is desired.

As will be evident from the following description, it is necessary for reasons conditioned by manufacturing technique to arrange the stiffening joists parallel with one another in the packing material, and in choosing the location of the stiffening joists in the finished packing container it must therefore be ensured that the packing material is oriented in such a manner that the stiffening or reinforcement joists obtain the correct orientation in relation to the height and width of the packing container. Naturally it also has to be ensured in the manufacture of the package that the zones of the packing material which have a latent capacity for expansion are located just at the parts of the packing container where the stiffening joists are wanted.

For the manufacture of a packing container in accordance with the invention thus a specially prepared packing material is required which is flexible and of uniform thickness, so that it can be rolled up in a magazine roll, and which can readily be formed to packing containers by folding and other machining, but which has the latent capacity of being able locally to expand so as to form stiffening joists. A cross-section of such a material 10 is shown schematically in FIG. 4 which material consists of a base layer or carrier layer 11 of foamed plastic material, and surface layers 13 of a homogeneous plastic material. As has been mentioned previously the foamed plastic material as well as the homogeneous plastic material can advantageously be constituted of polystyrene, but it is also conceivable to use other materials or combinations of other plastic materials, with the surface layers 13 in turn being constituted of laminate comprising e.g., layers which are impervious to gas or to light, such as polyvinylidene chloride, acrylonitrile compounds of the type which is sold under the tradename of BAREX or aluminum foil. These laminate combinations in the surface layers 13 are not referred to here in any detail, since they have to be chosen in each special case with a view to the requirements of the contents with regard to light protection, imperviousness to gas, etc., and with regard to the manufacture as well as the application of these surface layers 13, reference is made to the known art.

The base layer or carrier layer 11, which consists of foamed plastics with a cellular structure comprising closed cells is manufactured by the method described in the following through extrusion, the cellular structure being formed spontaneously when the plastic material leaves the extruder die. As can be seen from FIG. 4, the cellular structure in the carrier layer 11 is not homogeneous but within the region 12 the cellular structure is different in such a manner that the individual cells are considerably smaller which means that the number per unit of volume is considerably greater than in the remaining parts of the carrier layer 11. This in turn means that the foamed plastic material within the region 12 has a higher density than in the adjoining regions. The cells within the region 12 have a latent expansion capacity which is released when the plastic material is heated to such an extent that the walls of the individual cells soften and can be expanded by the increased gas pressure in the cells. This latent expansion capacity is much greater within the region 12 than in the adjoining regions, since the cells within the region 12 during the manufacture of the plastic material have not been given the opportunity of expanding as much as the cells in the adjoining parts.

In an alternative method for the manufacture of a material with local latent expansion capacity, the cells are not, as in FIG. 4, appreciably smaller than the cells in the adjoining regions, but they are instead, as shown in FIG. 4b, flattened, so that within the region 12 a considerably greater number of cells can be accommodated than in the adjoining region 11 of the packing material. These flattened cells in the region 12 have had during the manufacture actually the same size as the cells in the adjoining regions, but they have been pressed together by forced compression. If the cells within the region 12 are heated up again they will endeavor to assume once more their almost spherical shape, which means that the portion 12 will expand.

This expansion, which is initiated by the supply of heat, is illustrated in FIG. 5, where the region 12 of the packing material 10 has been heated so that the said region expands to a high degree. This expansion of the region 12 implies that the packing material 10 will have a longitudinal stiffening joist 14, which in the finished package is located in the manner described above.

The release of the latent expansion properties of the packing material may take place, as mentioned above, by heating, and this heating may be done with the help of radiant heat, blowing of hot air against the portions intended for expansion, or else by dipping of the finished, formed packing container into a suitably heated liquid. In FIG. 6 is shown schematically how a finished, formed packing container 1 is treated, in that the packing container is made to pass by a radiation element 16, which directs heat radiation towards the lateral edges 4 of the packing container 1. In the manufacture of the packing containers it has been ensured that the regions of the packing material which have a latent expansion capacity are located just along the lateral edges, so that the said lateral edges are made to expand, so as to form stiffening joists when the packing container 1 is made to pass by the radiation elements 16.

As is evident from the above description, the manufacture of packing containers in accordance with the invention requires a specially prepared packing material which can be manufactured with the help of arrangements as shown in FIGS. 7 and 8.

The arrangement in accordance with FIG. 7 consists of a foamed plastics extruder 17 in which the plastic material is melted and is mixed together with a gas which mostly consists of freon or nitrogen, which gas under high pressure is made to dissolve in the plastic material. When the heated plastic mass with its dissolved gas is pressed out through the extruder die, which is constituted of a narrow gap that may be straight or annular, a spontaneous release of the gas in the plastic mass takes place, which means that a large quantity of small gas bubbles are formed which impart to the extruded plastic film 21 a cellular structure. The extruded foamed plastic film 21 is made to pass between co-operating pressure and cooling rolls 18,19, whereupon the flexible material 22 of uniform thickness can be laminated further together with the outer layers 13, to be rolled up subsequently on a magazine roll. In this specific case, however, it is endeavoured to obtain within certain regions 24 a cellular structure which is of a different character from that in the region 21 situated in between, and to achieve this, the plastic material is cooled by means of special arrangements 23 within certain zones of the extruder die 20, in such a manner that the plastic material when it issues from the extruder die has already been stabilized to a certain degree within the said zones 24, which means that here will be less expansion than within the adjoining zones. Hence in the zones 24 a cellular structure with smaller cells but more cells per unit of volume is obtained, which means that within the zones 24 the foamed plastic material has a higher density than within the zones 21 situated in between. After passage through the pressure and cooling rolls 18,19 the material has become stabilized, and the zones 25 of the finished material have a latent expansion capacity which can be released by the supply of heat, whereas the adjoining portions 22 do not have the same expansion capacity, or at least have a much smaller degree of expansion capacity.

A variant of the arrangement according to FIG. 7 is shown in FIG. 8, where the extruder 17 has a specially designed extruder die 20, which comprises an extrusion orifice 26 with local recesses 27 of greater width than the remainder of the extrusion fissure 26. When the foamed plastic material is extruded through the fissure 26 more material will be pressed out through the recesses 27, so that the extruded material, after the passage through the extruder die, will have thickened portions. These thickened portions, however, are pressed together with the help of the combined pressure and cooling rolls 18,19 whilst the foamed plastic material is still warm and plastic, as a result of which the cells within the said thickened portions are compressed more than the cells within the adjoining regions, so that a packing material in accordance with FIG. 4b is formed. After passing through the rolls 18,19 the finished material 22 thus has a uniform thickness, whilst certain zones of the packing material have a higher density than adjoining zones, and a latent capacity for expansion under the influence of heat.

It has been shown that by means of an arrangement in accordance with the invention described here it is possible in an inexpensive manner to achieve an appreciably increased stiffness of the finished packages with only a small increase in material.

I claim:

1. A method for the manufacture of parallelepiped-shaped packing containers having stiffening portions from a packing material, said method comprising forming a packing material of substantially uniform thickness comprising at least one layer of foamed plastic material having spaced, rectilinear zones of a higher density than the density of the juxtaposed areas therebetween into packing containers with at least one of the spaced, rectilinear zones located along a lateral corner edge of the container and heating the containers at least along said at least one rectilinear zone of higher density at a lateral corner edge of the container so that the foamed plastic material thereof expands to form joist-like stiffenings of greater thickness than the juxtaposed areas.

2. A method in accordance with claim 1, wherein the heating is done with the help of hot air.

3. A method in accordance with claim 1, wherein the heating is done with the help of radiant heat.

4. A method in accordance with claim 1, wherein the heating is done with the help of a heated liquid bath into which the packing containers are dipped.

5. A method in accordance with claim 1, wherein the heating is done selectively along the parts where the stiffenings are required.

6. A method for making containers comprising:
   (a) extruding a foamed thermoplastic film of substantially uniform thickness, said film having a plurality of zones extending longitudinally within said film, said zones being laterally spaced from each other and containing cells with substantially smaller volume than the cells in the adjacent portions of the film;

(b) bending said film to form the wall of a container without substantially changing the thickness of the film;

(c) subsequently applying heat to said zones to cause expansion of said cells in said zones, whereby said expanded zones form joist-like stiffening members for the wall of said container.

7. The method according to claim 6, wherein said extruding step includes passing said film between cooperating cooling and pressure rolls to obtain said film with uniform thickness at the same time the film is cooled and stabilized.

8. The method according to claim 6, wherein said bending step includes forming a lateral edge with one of said zones being aligned with said edge.

* * * * *